C. F. JENKINS.
LIQUID HOLDING PAPER VESSEL.
APPLICATION FILED JUNE 18, 1908.
920,150.  Patented May 4, 1909.
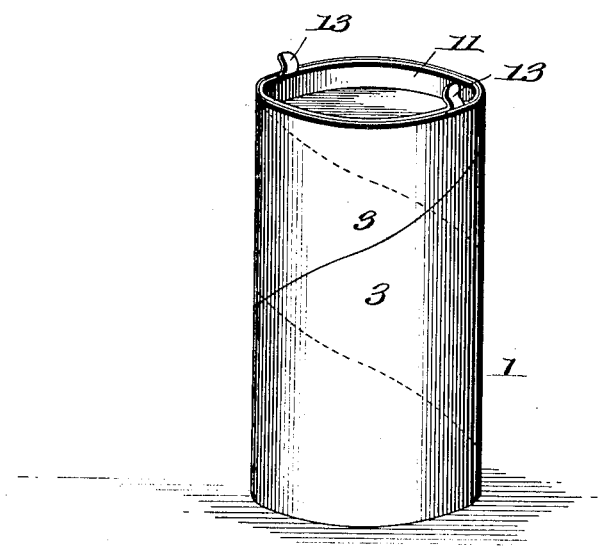
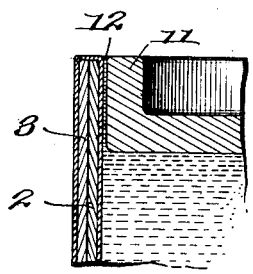
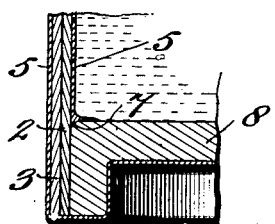
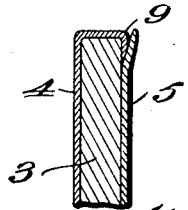
Witnesses
Geo. H. Bepul.
K. L. Byrne.
Inventor
C. F. Jenkins by
Wickinson Fisher
& Wilkinson
Attorney

UNITED STATES PATENT OFFICE.

CHARLES FRANCIS JENKINS, OF WASHINGTON, DISTRICT OF COLUMBIA, ASSIGNOR, BY MESNE ASSIGNMENTS, TO SINGLE SERVICE PACKAGE CORPORATION OF AMERICA, A CORPORATION OF NEW JERSEY.

LIQUID-HOLDING PAPER VESSEL.

No. 920,150.　　　　Specification of Letters Patent.　　　Patented May 4, 1909.

Application filed June 18, 1908. Serial No. 439,184.

*To all whom it may concern:*

Be it known that I, CHARLES FRANCIS JENKINS, a citizen of the United States, residing at Washington, in the District of Columbia, have invented certain new and useful Improvements in Liquid-Holding Paper Vessels; and I do hereby declare the following to be a full, clear, and exact description of the invention, such as will enable others skilled in the art to which it appertains to make and use the same.

My invention relates to liquid holding paper vessels, and the object of my invention is to produce a practical vessel of this nature which can be made at such a slight cost that it may be thrown away after being used for the first time, and thereby enable milk to be sold to the public in containers that are absolutely free from contamination.

It is well recognized that a fruitful source of disease at the present time is found in the unsanitary condition of the present glass milk bottles after they have been used one or more times. Careless or unscrupulous persons often put these bottles to uses after the milk is taken out of the same, which so contaminate them that the processes of cleaning to which they are afterward subjected, even when such processes are otherwise efficient, fail to thoroughly cleanse them. And these unsanitary bottles, as well as those that are rendered unsanitary by reason of their contained milk being already contaminated with disease germs, go from house to house spreading disease, notwithstanding the fact that the health departments of various cities have adopted the most stringent measures to prevent such evil.

While the milk container cannot in itself prevent disease germs from getting into the milk before it reaches said container; yet, if the vessel holding the milk is one that has not been subjected to any sources of contamination, it is evident that one great source of danger is obviated. This may be accomplished by putting the milk in absolutely clean and germ free vessels that have never been used before; and in order to employ such vessels they must be made at a cost sufficiently low to enable them to be thrown away after use. In other words, they must not only be made of paper, but they must be made by a process that will practically eliminate the cost of making. One of the essentials of a process sufficiently cheap to be commercially practical, is the making of a spirally wound tube of a uniform diameter, in order that great lengths of the same may be automatically made at a high speed and suitable sections cut off to form the vessels, or cans, without checking the speed of the machine. Neither a tapered tube, nor a cylindrical tube not spirally wound, could be made at such a speed as to fulfil the exacting conditions of cost involved in this problem. After the tube is thus made and cut into sections, the most vexatious problem to be met is that of efficiently closing the ends of the sections; and yet, still remain within the limits of costs, which for the whole vessel must be within a small fraction of a cent, when the vessel is of a moderate size. Furthermore, these closures must be of such a shape that not only may they be applied automatically by machinery in the shortest time possible, but the bottom closure must be permanently secured to the tubular body portion, while the top closure must be liquid tight and easily removable by hand.

The object of my invention, therefore, when more specifically stated, is to produce a milk holding vessel complying with all the above exacting conditions, and to these ends my invention consists in the details of construction and combination of parts more fully hereinafter disclosed and particularly pointed out in the claims.

Referring to the accompanying drawings forming a part of this specification in which like numerals refer to like parts in all the views:—Figure 1, is a perspective view of a liquid holding vessel made in accordance with my invention. Fig. 2, an enlarged detail sectional view of the top closure showing the capillary joint greatly exaggerated. Fig. 3, a like view of the bottom closure. Fig. 4, a detail sectional view through the tubular wall of the vessel showing the joints between the spirally wound strips and how they are closed, and Fig. 5, a detail sectional view of a portion of a strip showing the evil effects resulting from allowing the glue to extend over to the paraffin side of the strip.

1, indicates the vessel proper which is cylindrical and formed from an inside spirally wound strip 2, and an outside spirally wound strip 3. The strips break joint, as shown in Figs. 1 and 2, when they are wound in continuous lengths; and they are held together by a layer of glue 4, which must be confined strictly to one side of the same, for a reason that will appear more fully below.

While the continuous tube is being made, short sections suitable for liquid containing vessels are automatically severed, their bottom closures 8 inserted, and the open vessel thus formed is dipped into melted paraffin which coats said vessel inside and out with a layer of paraffin 5, the same extending into the crevices 6 between contiguous edges of the spirally wound strips, and also into the crevice 7 between the tubular wall and the inserted bottom. Now paraffin, as is well known, is chemically inert to all food products and is therefore the only inexpensive substance available for lining paper milk bottles. But it is, also, a glue repellent; and if any glue extends over to the paraffin side of the strip, as at 9, in Fig. 5, the paraffin will not attach itself to the paper, nor will it fix itself to the glue; but it will form a sort of blister in the coating 5, which blister will ultimately break, peel off, and leave a surface of the paper exposed to the penetration of the liquid, and thereupon result in the destruction of the vessel. It is therefore essential in the rapid and automatic coating of the strips with glue on one side, that absolutely no glue reach to the other side of said strips; and it is likewise essential that a dipping process be employed in order that every portion of the paper not covered by the glue may be reached by the paraffin, and the liquid therefore prevented from finding a place for penetrating the vessel's walls.

After the open ended vessel having absolutely no glue on its surface has been dipped in hot paraffin, and all its exposed parts thoroughly coated, it is essential that an inexpensive and thoroughly efficient closure be provided; and one that may be readily removed and put back into place. This problem is of the most exacting nature, since a pint of liquid weighs say one pound, and the blow delivered against such closure when the vessel is overturned is often considerable. The mere ordinary friction of an ordinary closure against a paraffined tubular surface if made great enough to stand the strains required, would involve such a tight fit between the parts that the paper can could not be made accurate enough; nor could the closure be inserted and taken out with sufficient readiness to make the same practical in daily use. On the other hand, if an ordinary closure be made sufficiently loose to permit an easy opening and closing of the can, then the ordinary friction would be quite insufficient to stand the strains of daily use.

After many laborious and costly experiments, I have discovered that if a paraffined paper closure 11 be fitted with a looseness just enough to permit the ready insertion and withdrawal of said closure, that a capillary film 12 will form between the walls of the closure and can, and hold the closure so tight that the can when full of milk may be quite roughly handled, turned upside down and thrown about without displacing said closure; and that the can may be also readily opened at any time by merely pulling on the ears 13 attached to the closure 11. As is well known, the force of capillary attraction is very great, and therefore it will be seen by bringing this force to my aid, I am enabled to raise the holding power of the closure to the degree desired, and at the same time to render the can easy to open. That this holding power is not due to a vacuum formed, or air pressure from the outside, may be readily demonstrated by puncturing the closure 11 with a pin, when it will be found to hold as before. In producing this closure, however, there are still problems to solve. If ordinary dry paper be struck up in a die to form the cup, it will break; if wet or damp stock be employed the operation will tear the same; and furthermore, since paper does not stretch like sheet metal, it is next to impossible to give such paper the necessary permanent set. My experiments, however, taught me that paraffin seemed to permit the particles of paper to slide over each other under the action of the die, thereby preventing the spreading or tearing of the paper, and at the same time giving it a permanent set. This result could not be attained unless the paper is paraffined before placing it in the die. Furthermore, while the closure should be flexible in order to accommodate itself to the flexible walls of the can; yet, at the same time, the ends of the can need stiffening in order to secure strength at those points. I secure these results by making the inverted cup 11 out of paper of about four times the thickness of the paper of the can walls. The above remarks apply also to the lower cup closure 8. Lastly, the ears 13, receive quite a strain in removing the closure, and therefore should be as strong as possible. By employing paraffined paper in the dies, the fiber of these ears is not broken where they join the rim of the cup, and by permitting them to extend in prolongation of said rim, instead of at an angle thereto, any breaking of the fiber is again avoided, so that in actual practice extending over many thousands of instances no difficulty was experienced in having these ears break off.

I am well aware that paper vessels very similar in outward appearance and in general structure to mine have long been known, and to the features of such vessels I lay no claim. But, at the same time, actual trial proves that not one of the vessels heretofore proposed can comply with all the exacting conditions for milk bottles above enumerated, while I have put into actual practical use probably five hundred thousand of my vessels, with the most satisfactory results. In fact, it was only after the practical use of some thousands of these vessels that I was enabled to search out and remedy the causes of the failures of those vessels that had gone before. It was found that such failures have not been due to any one single cause, but to the omission to observe and to provide the numerous minor features above disclosed. Accordingly, although it is possible to make my vessels by hand, I make them entirely and automatically by machinery. The tubes are made of a cylindrical shape to attain speed; means are provided to prevent the glue from getting on the paraffin side of the paper strips; the short sections are severed while the tube is still being formed and without changing the speed; the closures are of such a material that they can be automatically stamped out at a high rate of speed without injury to the material, and are of such a shape that they can be inserted readily into the tubular sections by machinery; the cans are automatically dipped and stood upright on end after draining so that the paraffin may settle in the crevices 7; and finally the removable top closure is so designed that while it may be made at a trifling cost, it is easy to remove and it holds tenaciously under all conditions.

What I claim is:—

1. A paper vessel adapted to contain liquids, comprising a cylindrical body portion composed entirely of spirally wound strips; a bottom closure composed entirely of paraffined paper having an inverted cup shape, the flanges of the cup being a plurality of times thicker than the walls of the vessel and closely fitting the interior of said vessel; a top closure also having an inverted cup shape, composed of paraffined paper, a plurality of times thicker than the walls of the vessel, and slidingly fitted to said vessel leaving sufficient space for said liquid to form a capillary film between its flanges and the walls of said vessel; and a layer of paraffin covering the exposed surfaces of said vessel, substantially as described.

2. A paper vessel adapted to contain liquids, comprising a spirally wound cylindrical tubular body portion having glue between the meeting surfaces of the spirals and destitute of glue on the other surfaces; a bottom closure, and a top closure, each of said closures consisting entirely of paraffined paper a plurality of times thicker than the walls of said vessel, provided with upturned flanges having a permanent set, fitting the interior of said vessel, said bottom closure being permanently secured in said vessel, and said top closure being slidingly fitted to said vessel with sufficient looseness to permit said liquids to form a capillary film between the same and the interior walls of said vessel; and a layer of paraffin covering said bottom closure and all parts of said spirals not covered by said glue, substantially as described.

3. A paper vessel adapted to contain milk, comprising a cylindrical tubular body consisting entirely of a plurality of strips of paper wound to break joints with each other, and to form said body, one of said strips being coated on one side with glue, and adapted to contact with a surface of the other strip, while the outer surfaces of said strips are destitute of glue; a bottom closure tightly fitting said body having a flanged inverted cup shape, and composed of a paraffined paper of substantially four times the thickness of each of said strips; a top closure of like material, shape, and thickness, provided with ears extending in prolongation of the flanges of the cup, said top closure being sufficiently small to leave a capillary space between said flanges and the interior of said vessel in which a thin film of said milk may lodge; and a layer of paraffin covering said bottom and all surfaces of said strips not covered by said glue, substantially as described.

In testimony whereof, I affix my signature, in presence of two witnesses.

CHARLES FRANCIS JENKINS.

Witnesses:
BEATRICE H. DAILEY,
T. A. WITHERSPOON.